No. 689,114. Patented Dec. 17, 1901.
G. E. PAPE.
PLEASURE CANAL.
(Application filed Oct. 2, 1901.)
(No Model.) 3 Sheets—Sheet 2.

WITNESSES.
William P. Goebel.
Walton Harrison.

INVENTOR
Gustav E. Pape
BY
ATTORNEYS

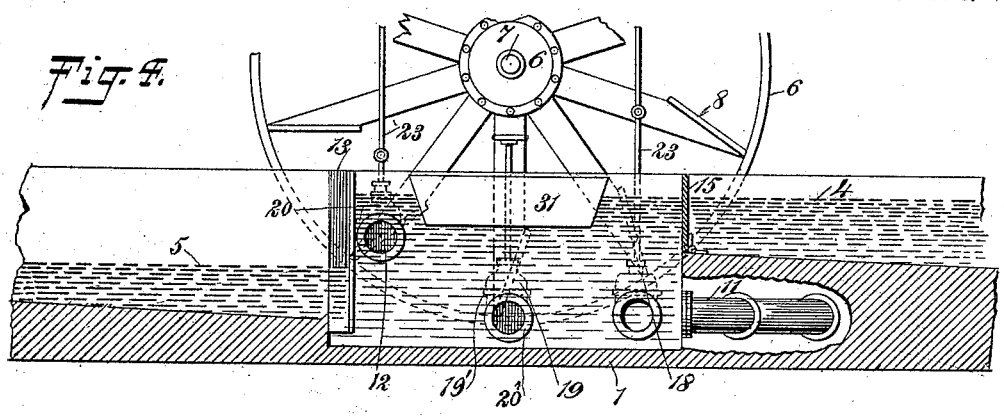
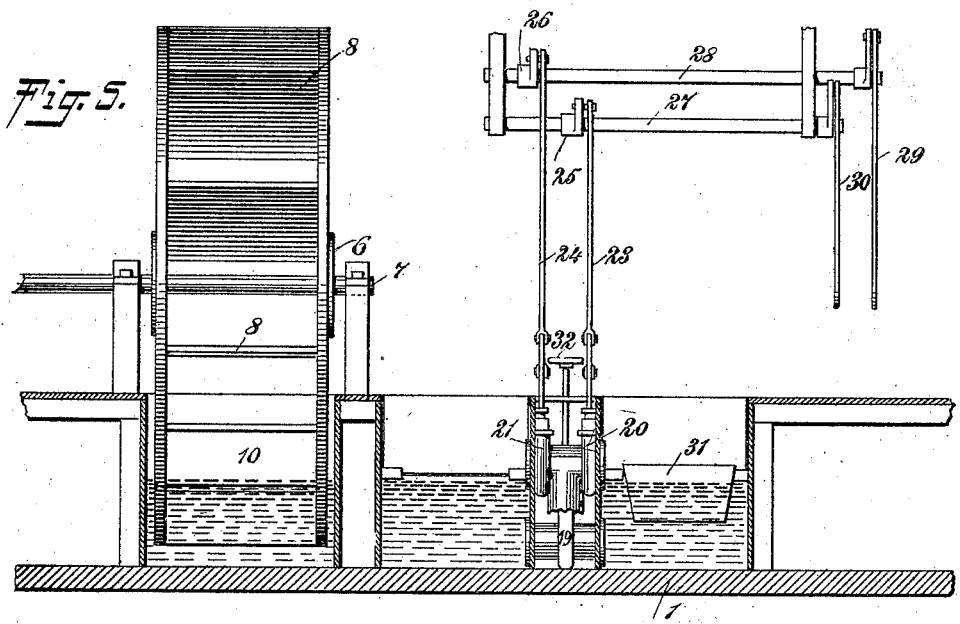
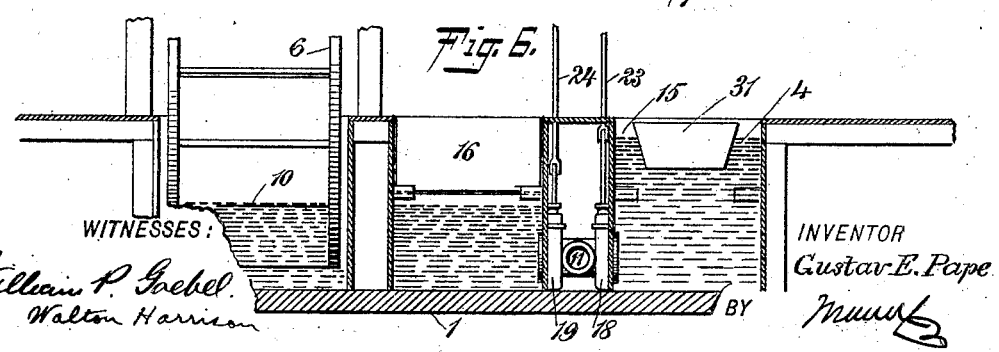

UNITED STATES PATENT OFFICE.

GUSTAV E. PAPE, OF BROOKLYN, NEW YORK.

PLEASURE-CANAL.

SPECIFICATION forming part of Letters Patent No. 689,114, dated December 17, 1901.

Application filed October 2, 1901. Serial No. 77,267. (No model.)

*To all whom it may concern:*

Be it known that I, GUSTAV E. PAPE, a citizen of the United States, and a resident of the city of New York, borough of Brooklyn, in the county of Kings and State of New York, have invented a new and Improved Pleasure-Canal, of which the following is a full, clear, and exact description.

My invention relates to pleasure-canals, and more particularly to means for removing boats from a low water-level to a relatively higher water-level and for maintaining different levels of water in the canal.

I will describe a pleasure-canal embodying my invention and then point out the novel features in the appended claims.

Reference is to be had to the accompanying drawings, forming a part of this specification, in which similar characters of reference indicate corresponding parts in all the figures.

Figure 1:
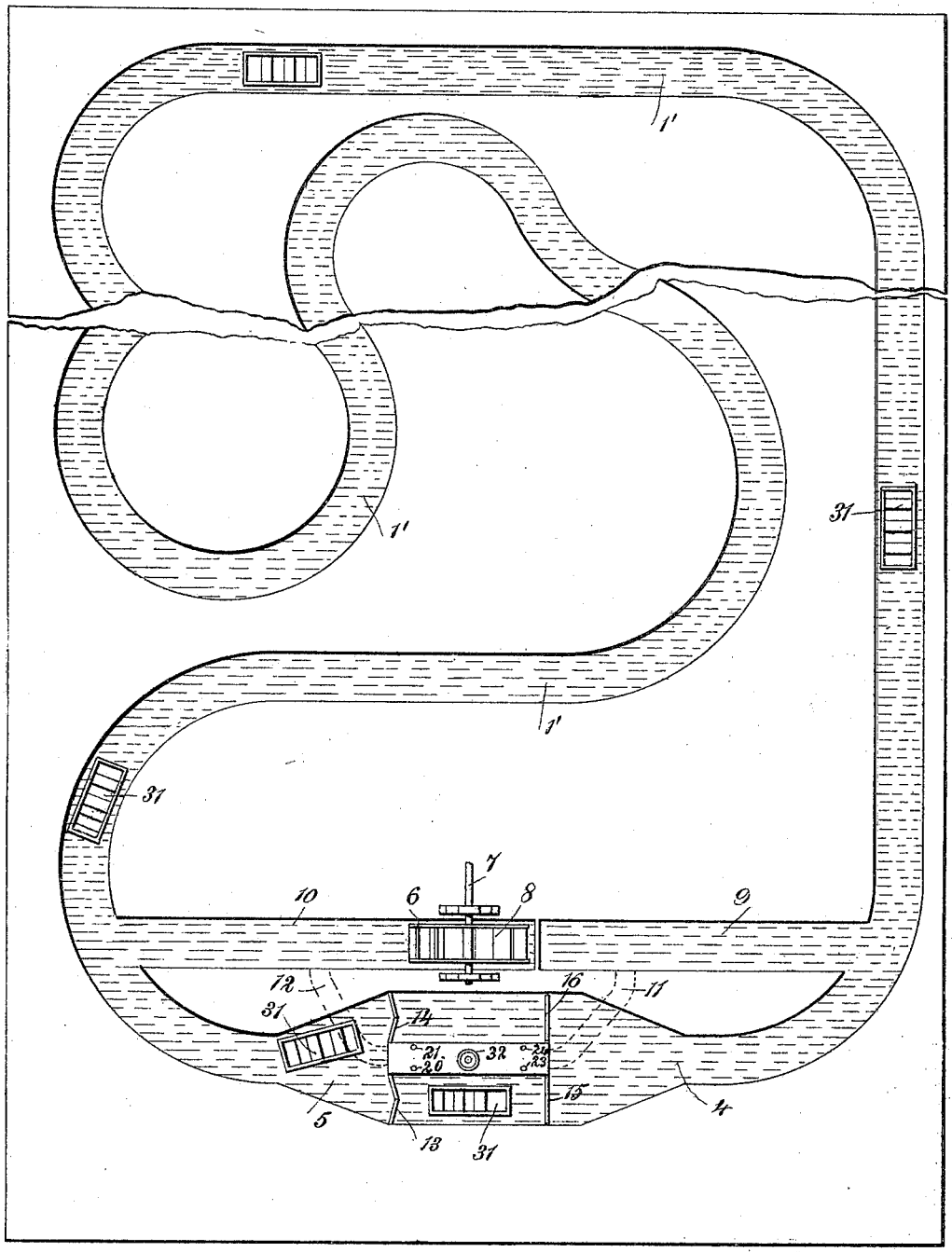
Figure 2:
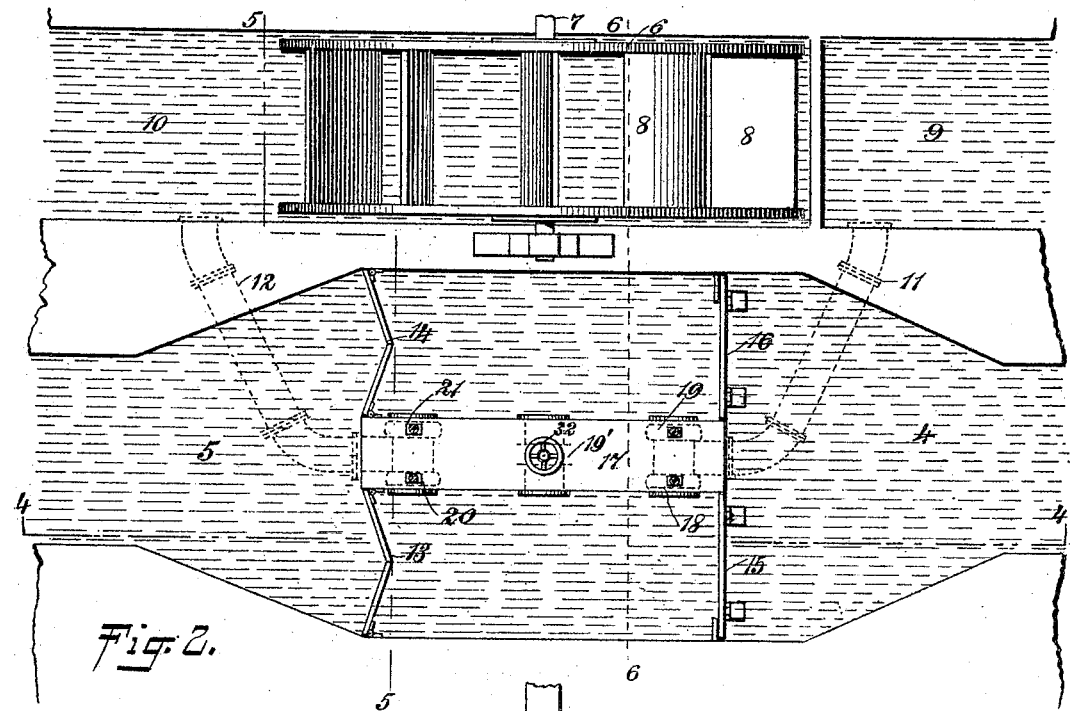
Figure 3:
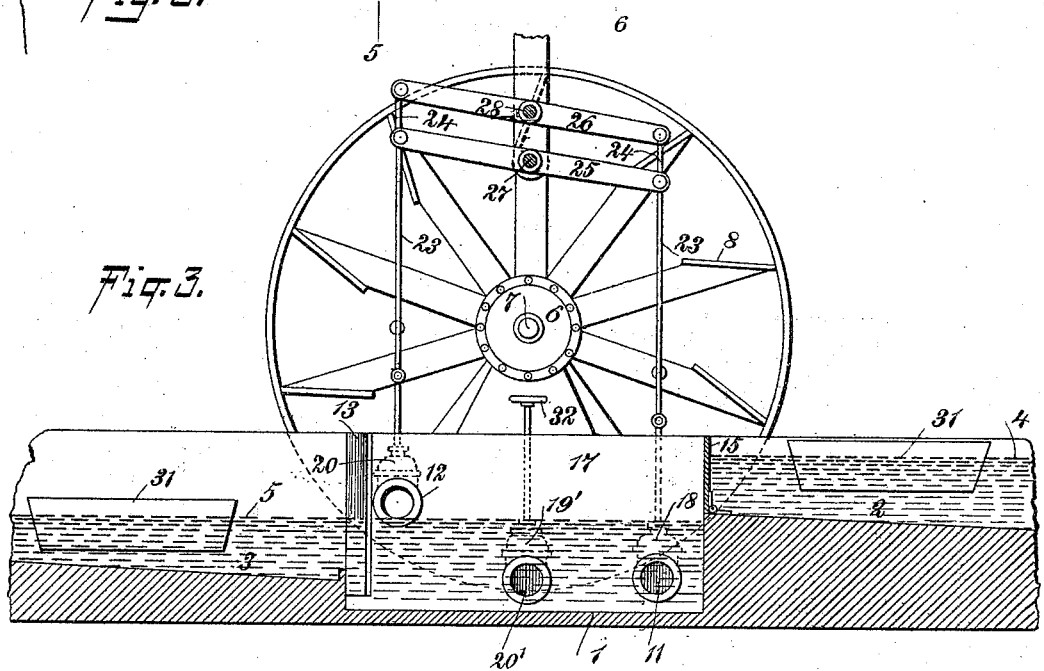

Figure 1 shows a plan view of a pleasure-canal to which my invention is applied. Fig. 2 is a plan view of the wheel for maintaining water at different levels and the lock for facilitating the passage of boats. Fig. 3 is an elevation of the same, partly in section. Fig. 4 is a longitudinal section upon the line 4 4 of Fig. 2. Fig. 5 is a cross-section upon the line 5 5 in Fig. 2, showing certain details in elevation; and Fig. 6 is a section upon the line 6 6 of Fig. 2.

The bottom of the lock is shown at 1, and the bottom of the canal at different points is shown at 2 3. The bodies of water at different levels are shown at 4 5 and at 9 10.

As shown in Fig. 1, the canal consists of a sinuous body of water 1', which is maintained at a higher level at one point than at another, the two points being immediately adjacent to each other and branching into two members. The bodies of water 5 10 are of approximately the same level, which is the lowest level to be found in the canal. The bodies of water 4 9 are of approximately the same level, which is higher than the level of the water 5 10.

The water-wheel 6 is mounted upon a shaft 7, which is rotated by any desired mechanical means in the usual manner. The wheel is provided with paddles 8, which are continually moving the water from the lower level to the higher level. The conduits 11 12 lead, respectively, from the higher and lower levels adjacent to the wheel to the interior of the locks shown in Fig. 2. These locks comprise gates 13 14 of the kind usually employed in canals, and they are kept closed by the pressure of the water. They are also provided with gates 15 16, which are hinged at the bottom for the purpose of allowing boats to pass over them. A box or casing 17 is provided between the locks for the purpose of holding the valves 18 19, connected with the conduit 11, and the valves 20 21, connected with the conduit 12, and also the emergency-valve 19', connected with the emergency-conduit 20'. This emergency-valve is provided with a hand-wheel 32 or equivalent device and is used when it is desirable to cause all the water in the locks to conform to a common level. The valves 18 19 20 21 are operated by means of valve-rods 23 24, which are connected to walking-beams 25 26, the same being pivotally mounted upon shafts 27 28. Handles 29 30 are connected with the shafts 27 28 and are used in operating the valves. The boats 31 are used for carrying passengers in the usual manner.

The operation of my device is as follows: Suppose that a boat 31 is in the position shown at the left in Fig. 3 and is about to enter a lock. The gate 13 is swung open and the boat passes in, the gate being afterward closed. The water in the lock is now at the lowest level. The valve 18 is thrown open and the valve 20 is closed by a movement of the handle 29. This causes the water to flow from the highest level adjacent to the wheel through the pipe 11 and to raise the boat into the position shown at the right in Fig. 6. The level of the water in which the boat is now floating is the same as that of the body of water 4, and the boat passes out of the lock by bending the gate 15 downward and outward. The gate being now closed, the boat proceeds downward upon its journey from the position shown at the right of Fig. 3, ultimately arriving at the position shown at the left of Fig. 3. The boat passing from the body of water 5 through the gate 14 is treated the same way, except that the water is here admitted through the valves 19 21 by means of the handle 30. This leaves the water in the lock at the same level as the water 4 or at the high level. To reduce it to the low level, the valve 21 is opened and the valve 18 closed, or the valve 21 is opened and the valve 19 closed as the case may be. This lowers the water in either side of the lock to the lowest level. It will be seen, therefore, that the two parts of the lock are entirely separate and independent and that the water may have a different level in one from that which it has in the other. By means of the emergency-valve, however, the two parts can attain a common level, as above described.

The valves 20 21 are so located that when they are open and the inlet-valves closed the water in the locks will be brought to the proper level to conform to the low-water level of the canal. By this arrangement any accidental change in the level of the water in the canal will not prevent the water in the locks from being reduced to the level which it should normally assume, for the reason that the level of water in the locks may thus be governed by the valves 20 and 21.

Having thus described my invention, I claim as new and desire to secure by Letters Patent—

1. A pleasure-canal, comprising a waterway provided with a wheel for maintaining separate bodies of water at different levels, locks adjacent to said wheel, conduits connecting said locks with said bodies of water, and means controllable at will for opening and closing said conduits.

2. A pleasure-canal, comprising a wheel for maintaining bodies of water at different levels, locks located adjacent to said bodies of water, inducts for admitting water into said locks, and educts for drawing water therefrom.

3. A pleasure-canal, comprising a waterway provided with a wheel for maintaining separate bodies of water at different levels, locks adjacent to said wheel, conduits connecting said locks with said bodies of water, and manually-operated valves for opening and closing said conduits.

4. A pleasure-canal, comprising a waterway provided with a wheel for maintaining separate bodies of water at different levels, locks adjacent to said wheel, conduits connecting said locks with said bodies of water, an emergency-conduit connecting said locks with each other, and manually-operated valves for opening and closing the said conduits.

5. A pleasure-canal, comprising a waterwheel for maintaining separate bodies of water at different levels, locks adjacent to said wheel, conduits connecting said locks with each other, and valves for opening and closing said conduits.

6. A pleasure-canal, comprising a waterwheel for maintaining separate bodies of water at different levels, locks adjacent to said wheel, means for admitting water to said locks, conduits for permitting water to flow out of said locks, said conduits being located slightly above the lowest water-level, and valves for opening and closing said conduits.

7. A pleasure-canal, comprising a sinuous waterway having ends disposed adjacent to each other and bifurcated, a water-wheel, locks disposed adjacent to each other for maintaining water at different levels in said ends of said waterway, conduits connecting said locks with adjacent bodies of water of different levels upon opposite sides of said wheel, and valves for opening and closing said conduits.

8. A pleasure-canal, comprising a sinuous waterway having ends disposed adjacent to each other and bifurcated, a water-wheel, locks disposed adjacent to each other for maintaining water at different levels in said ends of said waterway, conduits connecting said locks with bodies of water at different levels upon opposite sides of said wheel, valves for opening and closing said conduits, an emergency-conduit connecting said locks together, and valves for opening and closing all of said conduits.

9. A pleasure-canal, comprising a waterway, a water-wheel and locks for maintaining water in different parts thereof at different levels, conduits for changing the level of the water in said locks, a plurality of valves for opening and closing said conduits, levers for actuating said valves, and handles for operating said levers.

In testimony whereof I have signed my name to this specification in the presence of two subscribing witnesses.

GUSTAV E. PAPE.

Witnesses:
  S. DANGLER,
  FREDERICK PAPE.